United States Patent
Kyle et al.

(10) Patent No.: US 7,900,870 B2
(45) Date of Patent: Mar. 8, 2011

(54) VENT DOOR SYSTEM WITH LEVER MECHANISM

(75) Inventors: Randi Kyle, Stanwood, WA (US); Sergio Bainotti, Redmond, WA (US)

(73) Assignee: B/E Aerospace, Inc., Wellington, FL (US)

( * ) Notice: Subject to any disclaimer, the term of this patent is extended or adjusted under 35 U.S.C. 154(b) by 503 days.

(21) Appl. No.: 12/118,080

(22) Filed: May 9, 2008

(65) Prior Publication Data

US 2008/0277530 A1 Nov. 13, 2008

Related U.S. Application Data

(60) Provisional application No. 60/928,435, filed on May 9, 2007.

(51) Int. Cl.
*B64C 1/14* (2006.01)
(52) U.S. Cl. .................... 244/129.5; 244/129.4; 49/278
(58) Field of Classification Search ............... 244/129.5, 244/129.4, 129.1; 49/278, 276
See application file for complete search history.

(56) References Cited

U.S. PATENT DOCUMENTS

| 3,647,169 | A | | 3/1972 | Allwright et al. | |
|---|---|---|---|---|---|
| 4,125,235 | A | | 11/1978 | Fitzgerald et al. | |
| 5,031,863 | A | | 7/1991 | Noble | |
| 5,305,969 | A | * | 4/1994 | Odell et al. | 244/129.5 |
| 5,337,977 | A | * | 8/1994 | Fleming et al. | 244/129.5 |
| 5,846,127 | A | | 12/1998 | Kile | |
| 5,931,415 | A | * | 8/1999 | Lingard et al. | 244/129.5 |
| 6,454,210 | B1 | * | 9/2002 | Plattner | 244/129.5 |
| 7,168,659 | B2 | * | 1/2007 | Galvani et al. | 244/129.5 |
| 2002/0000493 | A1 | * | 1/2002 | Erben et al. | 244/129.5 |

FOREIGN PATENT DOCUMENTS

WO  WO 00/76841 A1  12/2000

* cited by examiner

*Primary Examiner* — Christopher P Ellis
(74) *Attorney, Agent, or Firm* — Drinker Biddle & Reath LLP (57) ABSTRACT

An aircraft vent door system includes a vent door for a vent on an aircraft door. A cam, having a groove, is disposed on the vent door. The system also includes a movement assembly, which includes a roller disposed within the groove, and a lever coupled to the movement assembly. A portion of the lever extends beyond and proximate to the perimeter of the vent door. A second lever may also be attached to the aircraft door. The first lever pivots in response to the movement of the movement assembly, and urges the second lever to pivot. The second lever, in turn, urges the vent door open, thereby overcoming the sticking effect of, for example, built up ice or other obstructions.

20 Claims, 8 Drawing Sheets

VENT DOOR SYSTEM WITH LEVER MECHANISM

CROSS-REFERENCE TO RELATED PATENT APPLICATIONS

This application claims benefit from U.S. Provisional Patent Application No. 60/928,435, filed on May 9, 2007, the entire contents of which being incorporated herein by reference.

TECHNICAL FIELD

This invention relates generally to vent door systems and, more particularly, to vent door systems that include lever mechanisms to open the vent door against the pressure caused by ice buildup.

BACKGROUND

Vents are used countless applications to provide an entrance or exit for the flow of air. When it is necessary to control whether air flows through a vent, then a vent door is typically used. An example of where vent doors are used is on the passenger doors of commercial aircraft. Vents allow the pressure inside the aircraft to be equalized with the pressure on the outside of the aircraft after the aircraft lands. One problem with conventional vent doors is ice build-up. Ice build-up occurs particularly when the air temperature on one side of the vent door is much lower than the air temperature on the other side of the vent door. This causes ice to build up on the vent door. When the ice builds up around the edges of the door, it can cause the door to become stuck in a closed position. This frequently occurs in commercial aircraft, since the temperatures outside of the aircraft at cruising altitude are usually well below zero degrees Fahrenheit. Thus, it can be seen that there is a need for a vent door system that includes a way of overcoming the problem of ice buildup.

SUMMARY

An embodiment of the present invention provides a vent door system. The vent door system includes a vent door. A cam is disposed on the vent door. The cam has a groove defined on it. The system also includes a movement assembly, which includes a roller, which is disposed within the groove, and a lever coupled to the movement assembly. A portion of the lever extends beyond and proximate to the perimeter of the vent door.

The lever can be one of at least two levers. The second lever can be attached to a surface beyond the periphery of the vent door.

A first portion of the cam can be attached to the vent door, and a second portion of the cam can pivotally attached to a surface outside of the vent door. The movement assembly can also include a first arm, a second arm, and a rod, with the first and second arms being connected to the rod such that, when the rod rotates about its longitudinal axis, the first and second arms move correspondingly, the first arm being coupled to the lever, the roller being attached to the second arm. Also, the cam can be a first cam, and the system can further include a second cam disposed on the vent door generally parallel to and facing the first cam, the second cam having defined thereon a groove. Also in this arrangement, the movement assembly can include a third arm having a roller that is disposed within the groove, with the third arm being connected to the rod.

In addition, the lever can be pivotally attached to the vent door, and the movement assembly includes an arm that is coupled to the lever when the vent door is opened. During opening of the vent door, the arm urges the portion of the lever that extends beyond the vent door against a surface that is beyond the vent door. Also, when the vent door enters a partially open position, the arm can decouple from the lever.

The vent door can include a generally planar panel, and a wall that surrounds and is generally perpendicular to the panel. In this arrangement, the panel and the wall define a cavity, and a generally planar member is disposed within the cavity and attached to the panel. Furthermore, the cam can be attached to the member. When used in an aircraft door having a vent opening defined therein, when the vent door is in a closed position, the vent door is seated within the opening. The vent door can have at least an open position, a movement assembly linked to the vent door, and a lever attached to the vent door. In this arrangement, the lever is coupled to the movement assembly when the vent door is in its closed position and uncoupled from the movement assembly when the vent door is in its open position. The lever can have a first end that protrudes beyond the periphery of the vent door, and a second end to which the movement assembly is coupled when the vent door is in its closed position.

The movement assembly can include an arm with a hooked end. In this arrangement, the lever can have a first end that protrudes beyond the periphery of the vent door, and a second end. The hooked end of the arm is coupled to the second end of the lever when the vent door is in its closed position. Also, the lever can be pivotally attached to the door. In this arrangement, when the movement assembly pulls the door toward its open position, the hooked end of the arm pulls on the second end of the lever, causing the lever to pivot, and urging the first end of the lever against a surface that is beyond the periphery of the door.

In another arrangement, the vent door system can include a cam attached to the door. The cam can have a groove defined on it, and the movement assembly includes an arm to which the roller is attached, such that when the arm pivots, the roller rolls along the groove and thereby urges the cam and the vent door away from a vent. The cam can have a first portion attached to the vent door, and a second portion pivotally attached to a surface outside of the vent door. Also, the cam can have defined thereon a groove, and the movement assembly can include a first arm, a second arm having a roller attached thereto, and a rod. The first and second arms can be connected to the rod such that, when the rod rotates about its longitudinal axis, the first and second arms move correspondingly. The first arm can be coupled to the lever, and the roller is disposed within the groove.

Also, the lever can be pivotally attached to the vent door. In this arrangement, the movement assembly includes an arm that is coupled to the lever when the vent door is opened and, during opening of the vent door, urges the portion of the lever that extends beyond the vent door against a surface that is beyond the vent door. The vent door can have a generally planar panel, and a wall that surrounds and is generally perpendicular to the panel. The panel and the wall define a cavity, and a generally planar member can be disposed within the cavity and attached to the panel. Furthermore, the movement assembly can be attached to the generally planar member. Hence, in an arrangement where an aircraft door has a vent opening defined therein, when the vent door is in a closed position, the vent door is seated within the opening.

Hence, in an aircraft door venting system according to an embodiment of the present invention, the aircraft door can have a vent and a vent door having an open position and a closed position. The vent door is seated within the vent when the vent door is in the closed position. The system also includes a rod disposed proximate to the vent door, and a first arm and a second arm attached to the rod. The first and second arms are generally perpendicular to the rod. The first arm has a hooked end and the second arm has a roller attached to it. The system also includes a cam having a first portion that is attached to the vent door and a second portion that is pivotally attached to a surface of the aircraft door. Defined on the cam is a groove, in which the roller is disposed. The system further includes a lever pivotally attached to the vent door, with one end of the lever being coupled to the hooked end of the first arm when the vent door is in the closed position.

DETAILED DESCRIPTION

An embodiment of the present invention described herein is generally directed vent door system having a lever. FIGS. 1-8 illustrate examples of the vent door system according to various embodiments of the present invention. The system, generally labeled 10, is integrated with an aircraft door 8 in this example. The aircraft door 8 has a vent opening 9 (shown in FIG. 6), around which a vent door frame 12 is disposed. The vent door frame 12 is attached to the aircraft door 8. The system also includes a vent door 14, which has an open position and a closed position. A flexible seal 13 is attached to the vent door 14. When in its closed position, a peripheral lip 15 of the vent door 14 is seated against the seal 13 and within the opening around which the vent door frame 12 is disposed. The vent door 14 includes a front panel 18 and a wall 20. The front panel 18 and the wall 20 define a cavity 22. The vent door 14 further includes a first generally planar member 24 and a second generally planar member 26 that are integrally formed with the front panel 18 and run along the length of the vent door 14. The vent door 14 further includes a first rib 27 and a second rib 28, also integrally formed with the first panel 18. Attached to the vent door 14 are two brackets 62 and 64. The brackets 62 and 64 are fastened to the vent door 14 by bolts.

Figure 1:
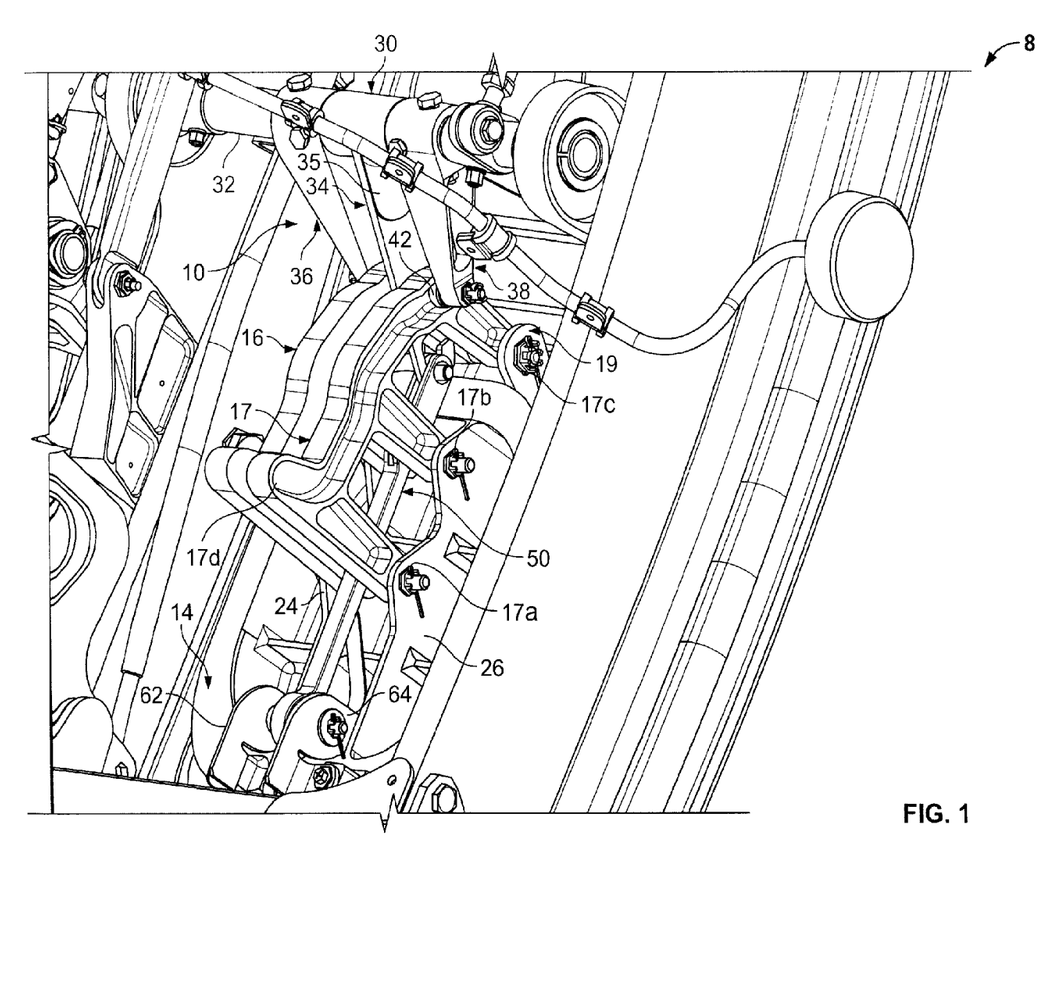
FIG. 1 illustrates an aircraft door that incorporates a vent system according to an embodiment of the present invention.
Figure 2:
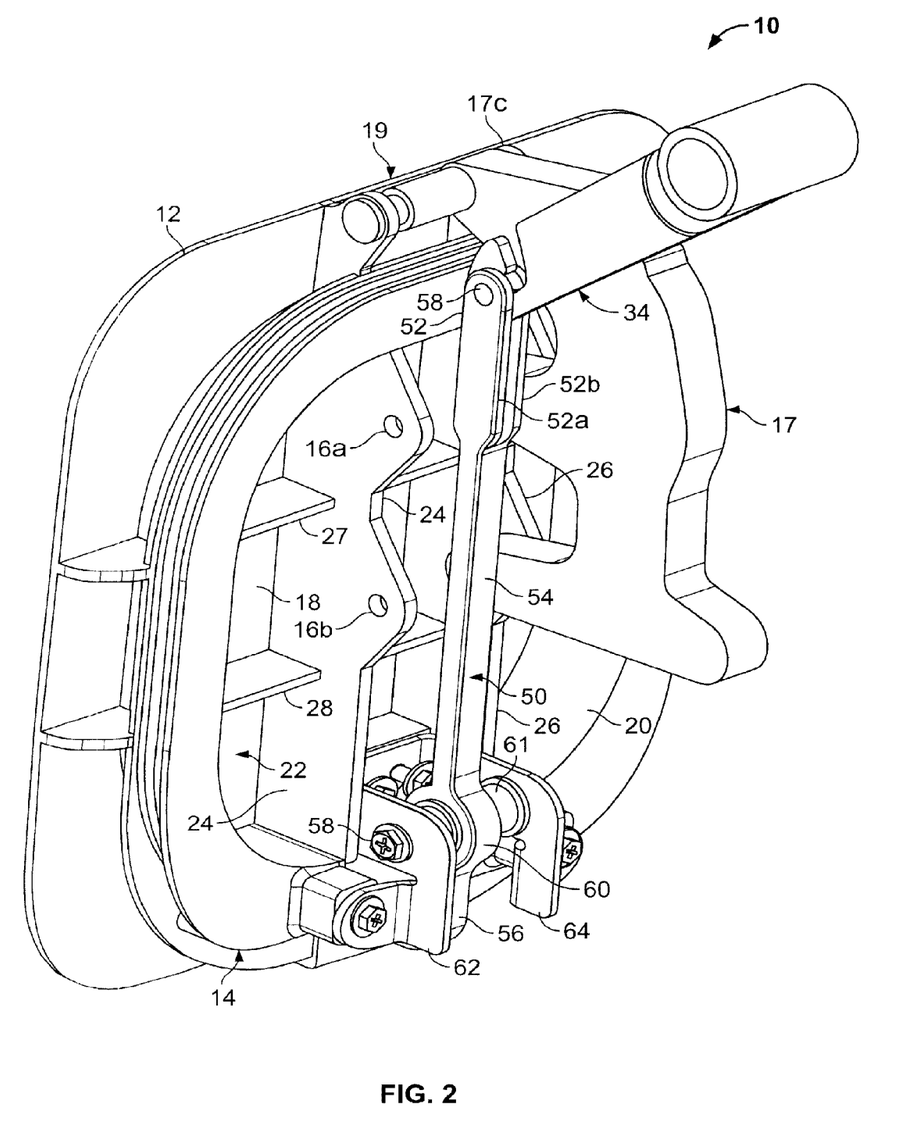
FIG. 2 further illustrates the vent system as shown in FIG. 1.
Figure 3:
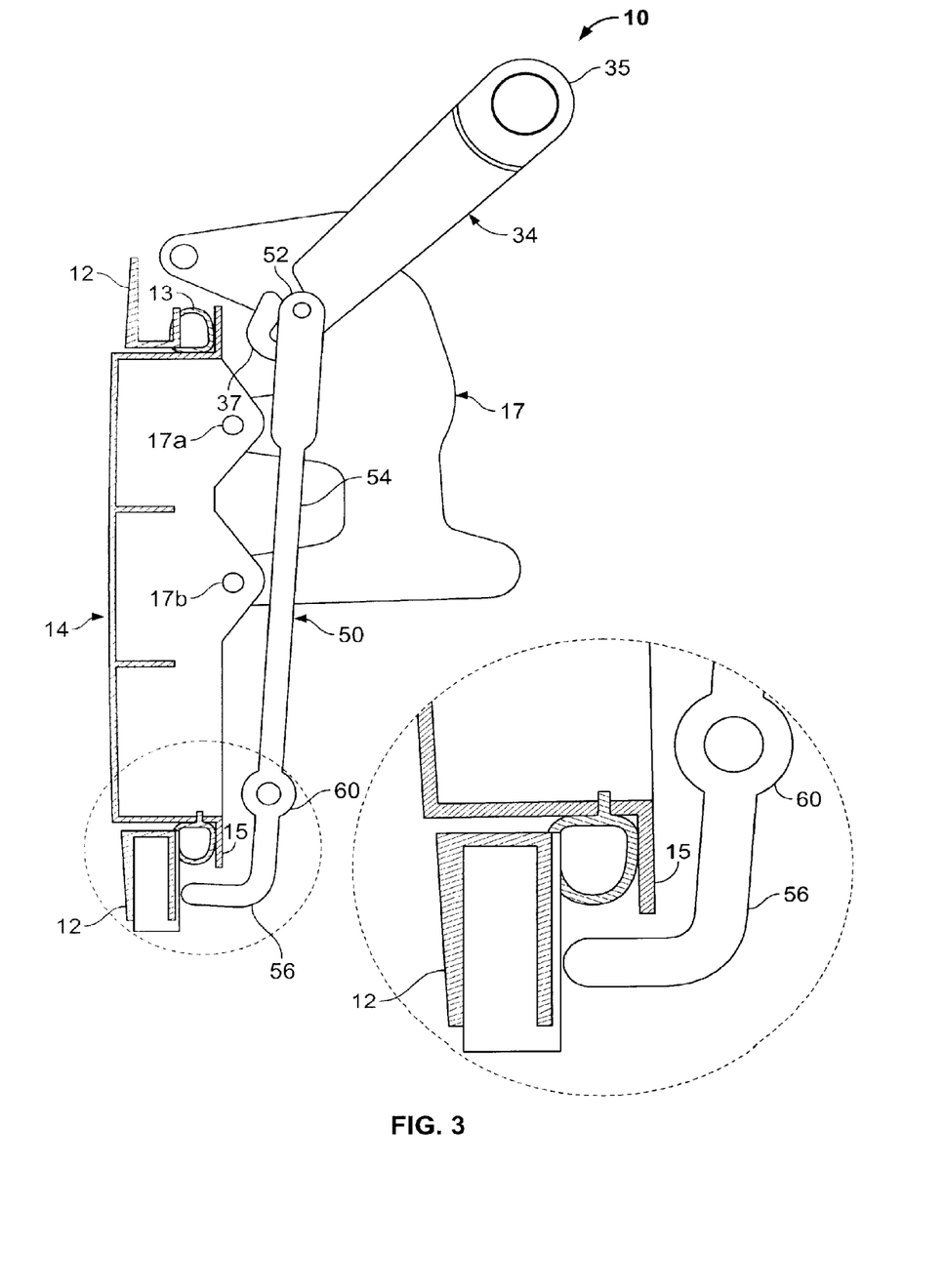
FIGS. 3-6 illustrate an example of the operation of the lever in the vent system as shown in FIGS. 1 and 2 according to an embodiment of the present invention.
Figure 4:
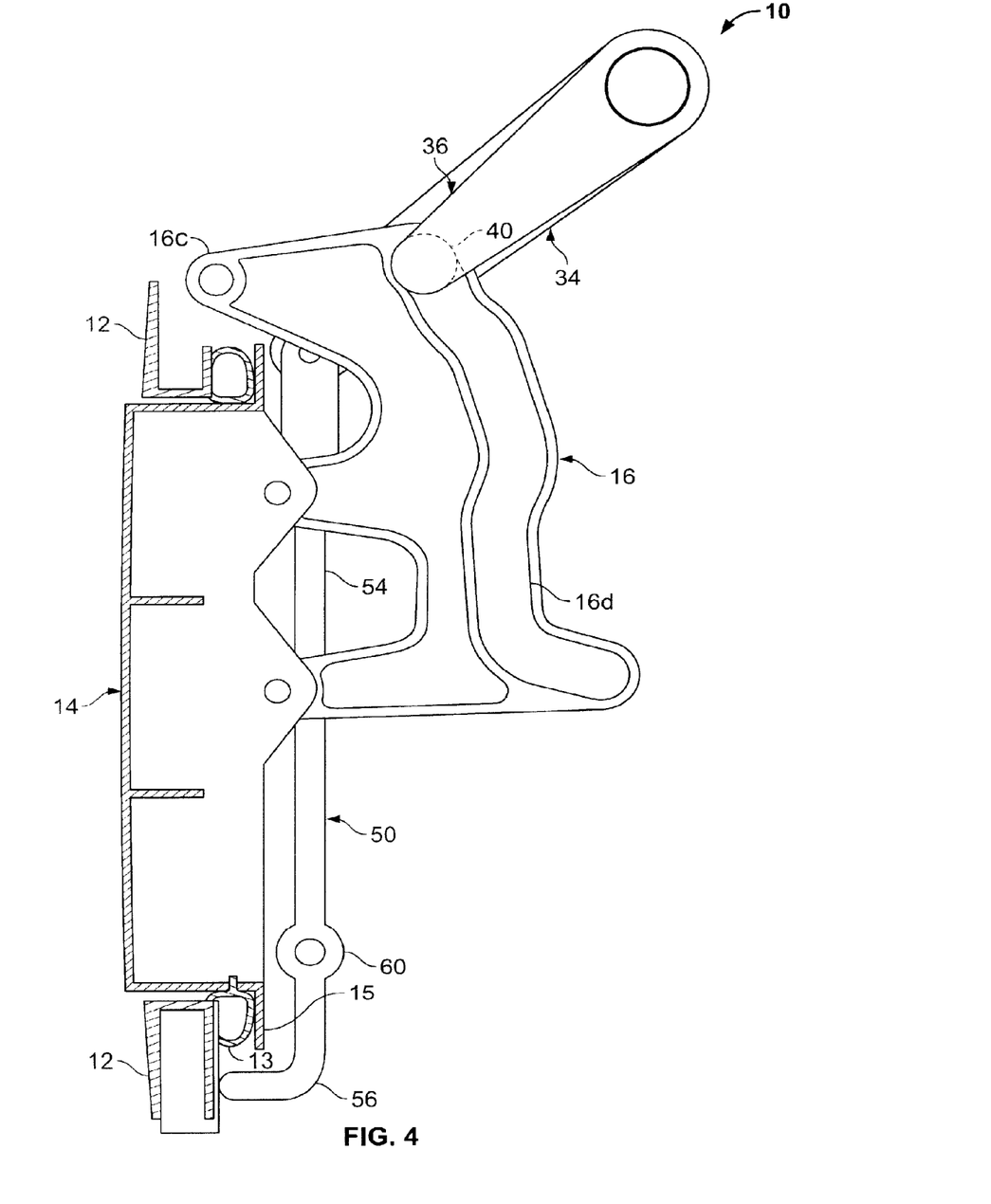
Figure 5:
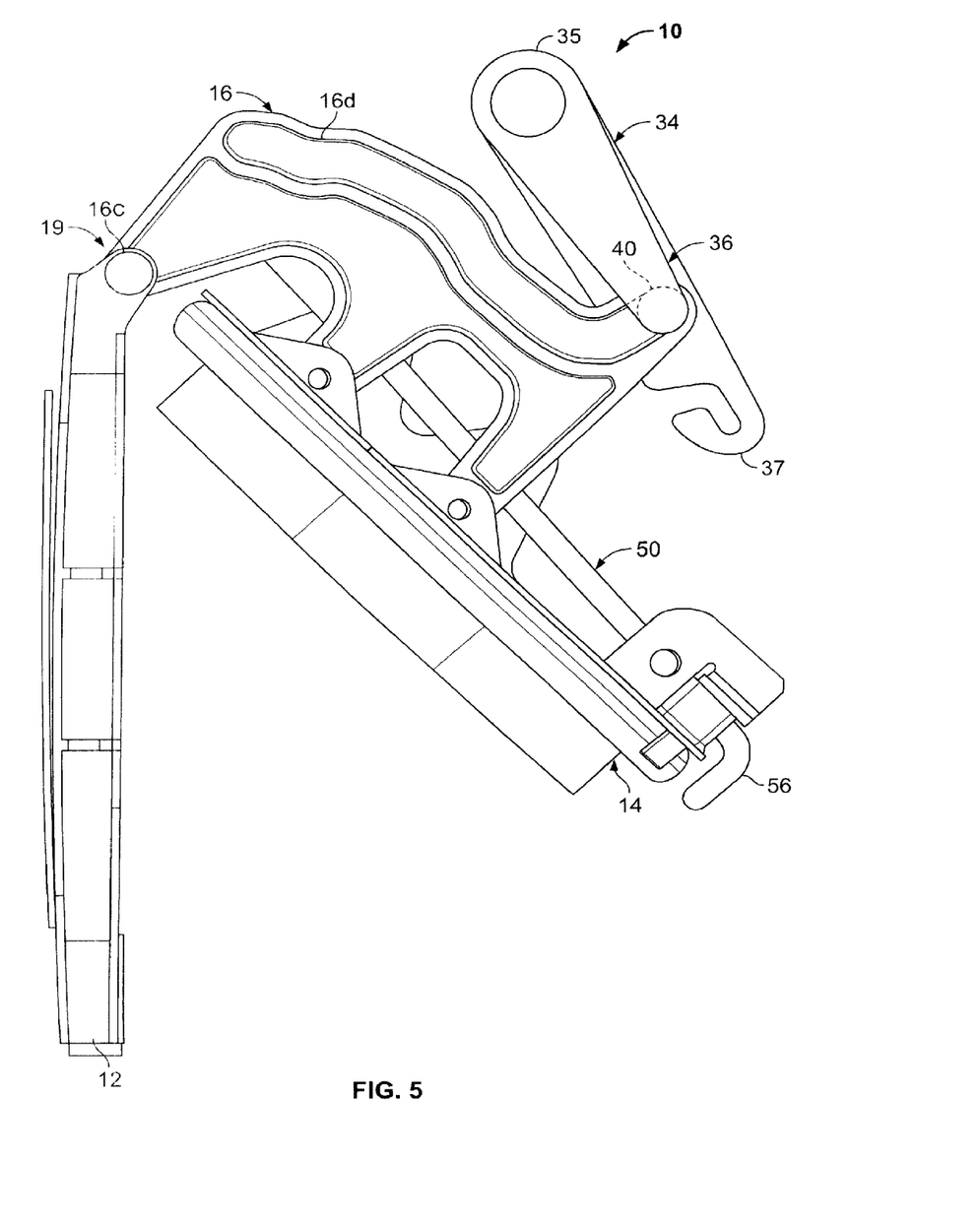
Figure 6:
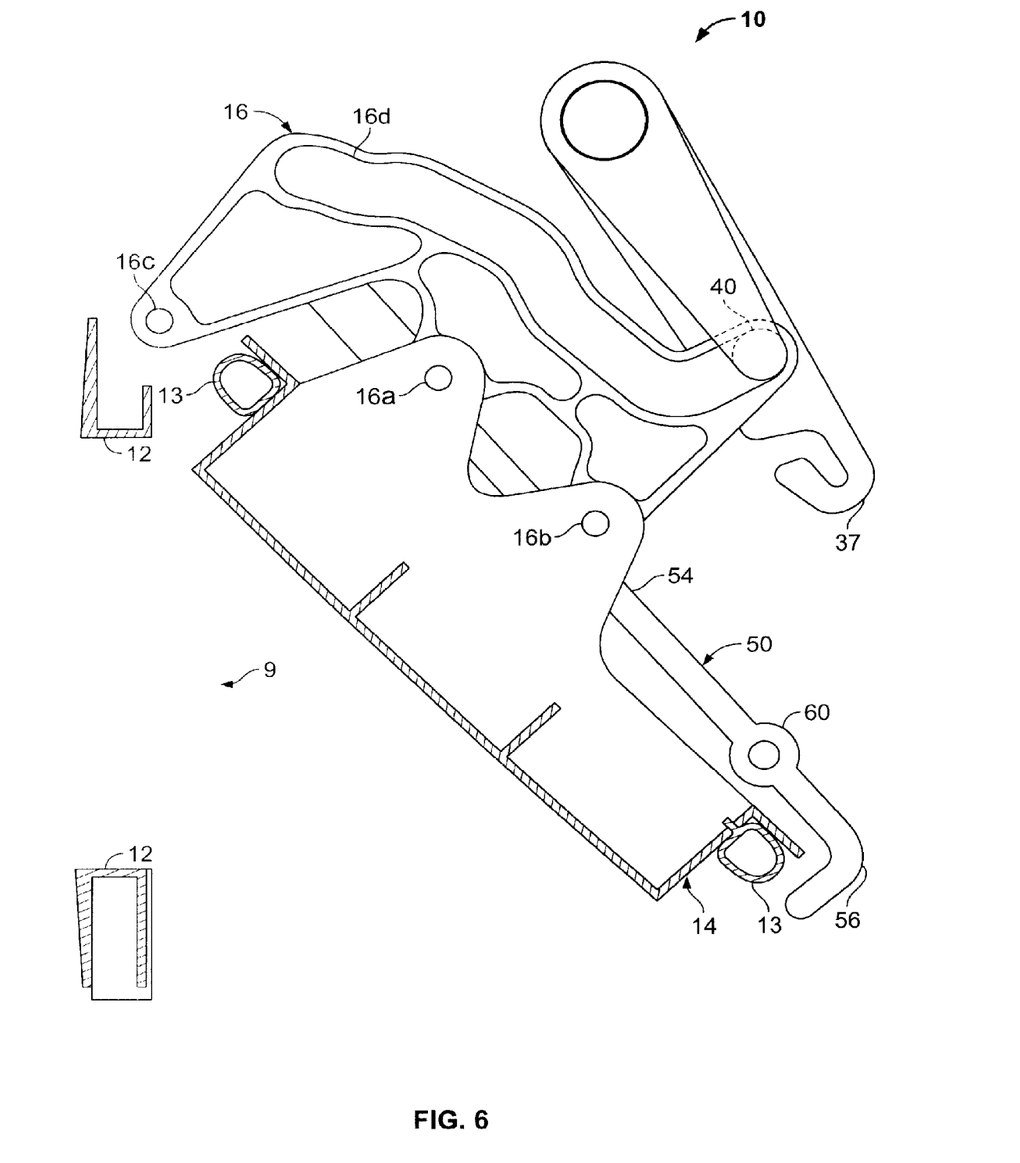
Figure 7:
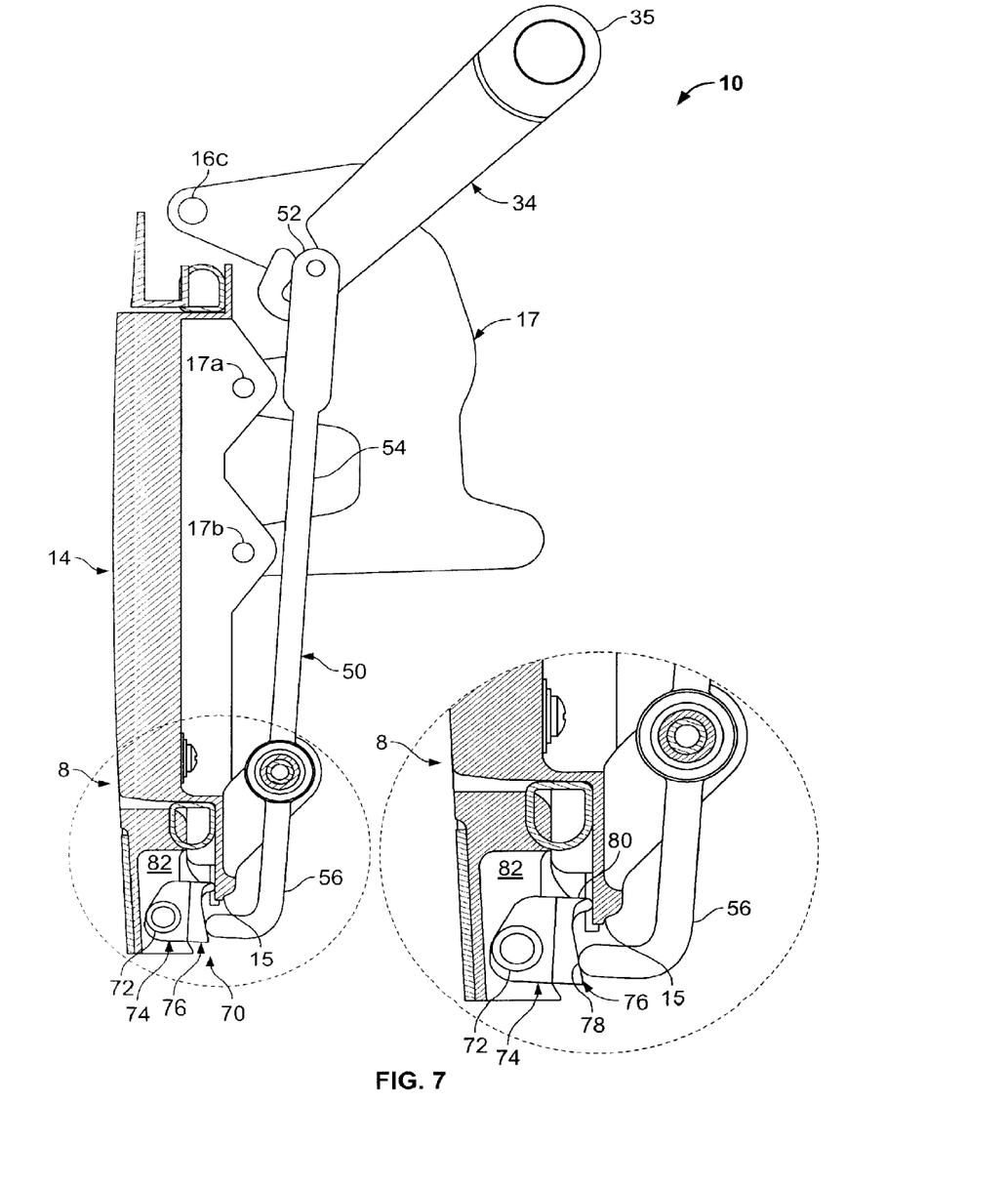
FIGS. 7-8 illustrate modifications to the embodiment of the vent system as shown in FIGS. 1 and 2.

The vent door system 10 further includes a first cam 16 and a second cam 17. Both the first and second cams 16 and 17 are shown in FIG. 1. In FIGS. 2, 3, and 7, only the second cam 17 is shown. In FIGS. 4, 5, 6, and 8, only the first cam 16 is shown. The first cam 16 is attached to the vent door 14 at points 16a and 16b, while the second cam 17 is attached to the vent door 14 at points 17a & 17b. The vent door frame 12 also includes a hinge 19. The first cam 16 is attached to the hinge 19 at point 16c, which the second cam 17 is attached to the hinge 19 at point 17c. The first cam 16 has defined thereon a groove 16d. Similarly, the second cam 17 has defined thereon a groove 17d. The vent door 14 moves from its open position to its closed position and vice versa via the movement of the first and second cams 16 and 17. Specifically, the first and second cams 16 and 17 pivot about the hinge 19, taking the attached vent door 14 with them.

Also included in the vent door system 10 is a lever 50. The lever 50 is an elongated member that has a first end 52, a middle portion 54 and a second end 56. The first end 52 has two generally planar members 52a and 52b that face one another and are generally parallel to each other. Between the two planar members 52a and 52b is a gap. A pin 58 connects the two planar members 52a and 52b across the gap. The middle portion 54 of the lever 50 is generally solid. Between the middle portion 54 and the second end 56 is a rounded portion 60. The second end 56 of the lever 50 is generally solid and hooks at about a 90 degree angle. The lever 50 is attached to the vent door 14 by a bolt 58 that extends through a sleeve 51 that passes through a hole in the rounded portion 60 of the lever 50 and is anchored by the brackets 62 and 64. The lever 50 pivots about the sleeve 51.

The vent door system 10 also includes a movement assembly, which imparts the force to the first and second cams 16 and 17 necessary to move the vent door 14 from its open to its closed position and vice versa. The movement assembly, generally labeled 30, includes a rod 32 (shown in FIG. 1) that is rotatable around its longitudinal axis, a first arm 34, second arm 36 and third arm 38 that are attached to the rod 30. The first arm 34 has a first end 35, which is attached to the rod 32, and a second end 37, which is hooked. The second arm 36 has a first end and a second end. The first end of the second arm 36 is attached to the rod 32. Disposed on the second end of the second arm is a roller 40. Similarly, the third arm 38 has a first end and a second end. The first end of the third arm 38 is attached to the rod 32. Disposed on the second end of the third arm 38 is a roller 42. The roller 40 of the first arm 36 is disposed in the groove 16d of the first cam 16, and the roller 42 of the second arm 38 is disposed within the groove 17d of the second cam 17.

The functionality of the vent door system in an embodiment of the invention will now be described. To move the vent door 14 from its closed position to its open position, the following exemplary steps occur. First the rod 32 rotates (counterclockwise from the perspective of FIGS. 4-6). This rotation causes the first arm 34, the second arm 36 and the third arm 38 to rotate at or near 5 degrees (also counterclockwise from the perspective of FIGS. 4-6). The rotation of the first arm 32 pushes the lever 50 against the frame 12, thereby forcing the vent door 14 open approximately 2.5 millimeters, thereby breaking ice that may have been formed between the vent door 14 and the frame 12. As the second arm 36 and third arm 38 rotate, the rollers 40 and 42 rotate against the profile of the respective grooves 16d and 17d of the first cam 16 and the second cam 17, and the first and second arms 36 and 38 pull the first and second cams 16 and 17 in proportion to the profile of the grooves. This pulling force causes the cams 16 and 17, along with the vent door 14, to pivot counterclockwise (from the perspective of FIGS. 4-6) about the hinge 19. As the vent door 14 pivots, the first arm 34 decouples from the lever 50. When the first, second and third arms 34, 36 and 38 have rotated at or about 75 degrees, the vent door 14 will have opened about 45 degrees. To close the vent door 14, the rod 32 rotates clockwise (from the perspective of FIGS. 4-6), thereby moving the first, second and third arms 34, 36 and 38 clockwise. The action of the second and third arms 36 and 38 along with the rollers 40 and 42 force the first and second cams 16 and 17 to rotate clockwise (from the perspective of FIGS. 4-6) about the hinge 19, which moves the vent door 14 into its closed position. As the vent door 14 closes, the first arm 34 reconnects with the lever 50.

Figure 8:
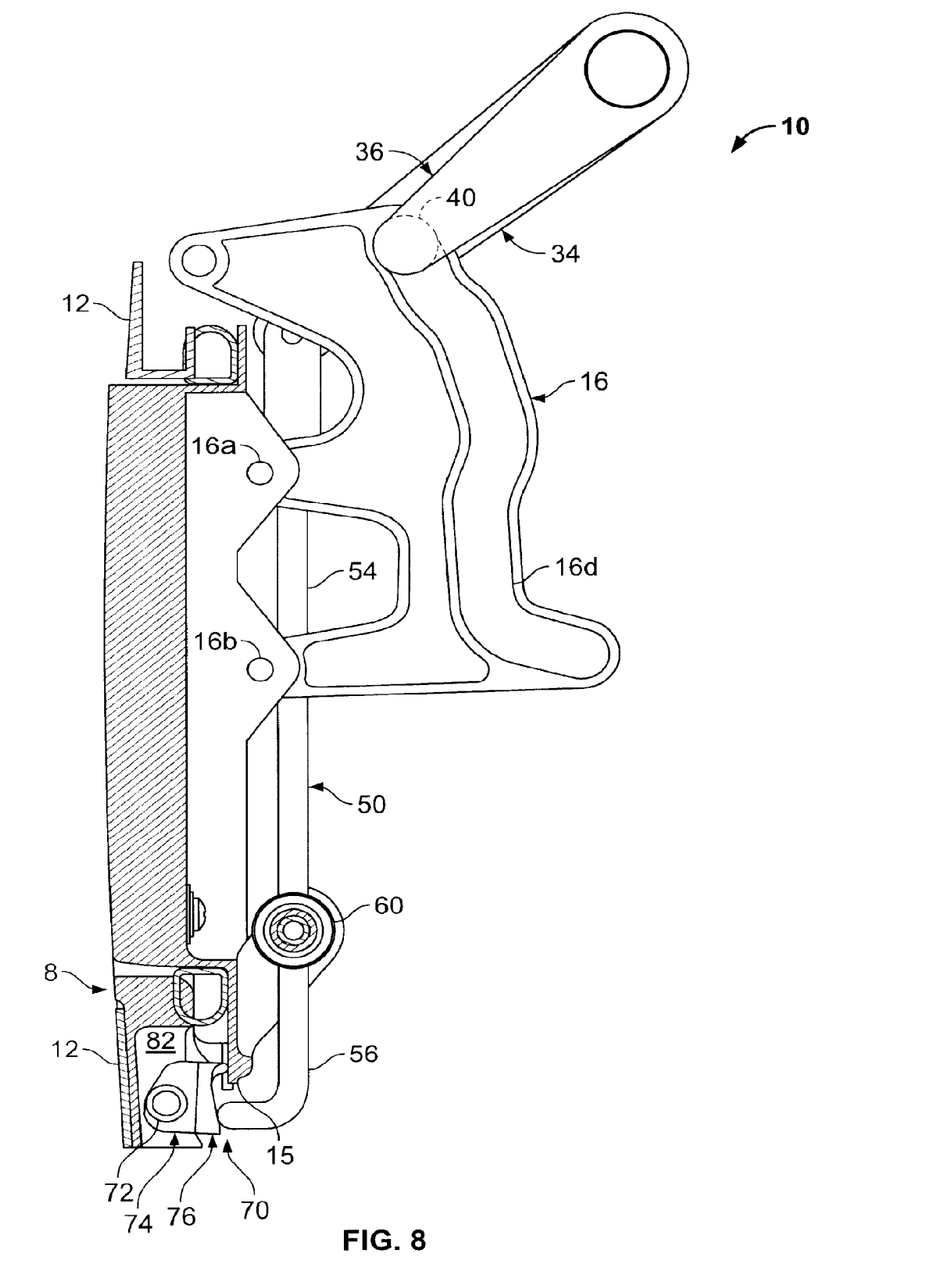

Referring to FIGS. 7 and 8, another embodiment of the invention is shown. In this embodiment, the vent door system 10 includes a second lever 70 that is attached to the aircraft door 8 by a pivot 72. The second lever 70 has a first section 74 and a second section 76. The first section 74 is disposed between the second section 76 and the door 8 and has a hole through which the pivot 72 passes. The second section 76 is disposed on top of the first section 74 and is between the first section 74 and the second end 56 of the lever 50. The first section 74 has a first portion 78 that slopes at an acute angle relative to the door 8, and a second portion 80 that curves upward to a point that is substantially vertical relative to the door 8. The second lever 70 is disposed within a depression 82 of the door 8, so that it sits below the lever of the vent door 14. When the vent door 14 is in the closed position, the tip of the second portion 80 is just below or touches the peripheral lip 15 of the vent door 14. The remaining portions of the vent door system 10 have the same structures shown in FIGS. 1-6 and previously described.

To move the vent door 14 from its closed position to its open position, the following steps occur. First the rod 32 rotates (counterclockwise from the perspective of FIGS. 7-8). This rotation causes the first arm 34, the second arm 36 and the third arm 38 to rotate at or near 5 degrees (also counterclockwise from the perspective of FIGS. 7-8). The rotation of the first arm 32 pushes the first lever 50 against the first portion 78 of the second section 74 second lever 70. The second lever 70 rotates clockwise about the pivot 72. The second portion 80 of the second section 74 of the second lever 70 pushes upward against the lip 15 of the vent door 14 thereby breaking ice that may have been formed between the vent door 14 and the frame 12. As the second arm 36 and third arm 38 rotate, the rollers 40 and 42 rotate against the profile of the respective grooves 16d and 17d of the first cam 16 and the second cam 17, and the first and second arms 36 and 38 pull the first and second cams 16 and 17 in proportion to the profile of the grooves. This pulling force causes the cams 16 and 17, along with the vent door 14, to pivot counterclockwise (from the perspective of FIGS. 7-8) about the hinge 19 in the same fashion as shown in the description of the previous embodiment in FIGS. 4-6. As the vent door 14 pivots, the first arm 34 decouples from the lever 50. When the first, second and third arms 34, 36 and 38 have rotated at or about 75 degrees, the vent door 14 will have opened about 45 degrees. To close the vent door 14, the rod 32 rotates clockwise (from the perspective of FIGS. 7-8), thereby moving the first, second and third arms 34, 36 and 38 clockwise. The action of the second and third arms 36 and 38 along with the rollers 40 and 42 force the first and second cams 16 and 17 to rotate clockwise (from the perspective of FIGS. 7-8) about the hinge 19, which moves the vent door 14 into its closed position. As the vent door 14 closes, the first arm 34 reconnects with the first lever 50.

It can be seen from the foregoing that a new and useful vent door system with a lever has been described. The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

What is claimed is:

1. A vent door system comprising:
   a vent door;
   a cam disposed on the vent door, the cam having a groove defined thereon;
   a movement assembly comprising a roller and an arm, the roller being disposed within the groove, the arm being attached to the roller such that when the arm pivots, the roller rolls along the groove, thereby urging the cam and the vent door to pivot away from the vent; and
   a lever coupled to the movement assembly, a portion of the lever extending beyond and proximate to the perimeter of the vent door such that when the roller rolls along the grove, the lever pivots, thereby forcing the portion extending beyond the door in a direction opposite to the direction in which the vent door is opening so that the portion contacts a surface beyond the vent door to cause the lever to drive the vent door in the direction in which the vent door is opening.

2. The system of claim 1, wherein the lever is a first lever, the system further comprising a second lever disposed beyond the perimeter of the vent door and proximate to the portion of the first lever that extends beyond the perimeter of the vent door.

3. The system of claim 1, wherein a first portion of the cam is attached to the vent door, and a second portion of the cam is pivotally attached to a surface outside of the vent door.

4. The system of claim 1, wherein the arm is a first arm, the movement assembly further comprises a second arm, and a rod having a longitudinal axis, the first and second arms being connected to the rod and arranged to pivot around the longitudinal axis such that, when the rod rotates about its longitudinal axis, the first and second arms move correspondingly, the second arm being coupled to the lever.

5. The system of claim 4, wherein the cam is a first cam, the system further comprising a second cam disposed on the vent door generally parallel to and facing the first cam, the second cam having defined thereon a groove, the movement assembly further comprises a third arm, the third arm having a roller that is disposed within the groove, the third arm being connected to the rod.

6. The system of claim 1, wherein the lever is pivotally attached to the vent door and the arm is a first arm, the movement assembly further comprising a second arm that is coupled to the lever when the vent door is opened and, during opening of the vent door, urges the portion of the lever that extends beyond the vent door against the surface that is beyond the vent door.

7. The system of claim 6, wherein, when the vent door enters a partially open position, the second arm decouples from the lever.

8. The system of claim 1, wherein the vent door comprises a generally planar panel, a wall that surrounds and is generally perpendicular to the panel, the panel and the wall defining a cavity, and a generally planar member disposed within the cavity and attached to the panel, the cam being attached to the member.

9. The system of claim 1, further comprising an aircraft door having a vent opening defined therein, wherein, when the vent door is in a closed position, the vent door is seated within the opening.

10. A vent door system for an aircraft, the vent door system comprising:
    a vent door having at least an open position, the vent door being attached to a door of the aircraft;

a movement assembly linked to the vent door;

a first lever pivotally attached to the vent door, the lever being coupled to the movement assembly when the vent door is in its closed position and uncoupled from the movement assembly when the vent door is in its open position; and a second lever pivotally attached to the aircraft door, a first portion of the second lever being in contact with the first lever and a second portion of the second lever being in contact with the vent door, such that the movement assembly pivots the first lever in a direction toward the first portion of the second lever to cause the first lever and the second portion of the second lever to drive the vent door in a direction toward the open position.

11. The system of claim 10, wherein the first portion and the second portion of the second lever are on opposite sides of the pivot of the second lever.

12. The system of claim 10, wherein the movement assembly includes an arm with a hooked end, and the first lever has a first end that protrudes beyond the periphery of the vent door and a second end, the hooked end of the arm being coupled to the second end of the first lever when the vent door is in its closed position.

13. The system of claim 12, wherein when the movement assembly pulls the door toward its open position, the hooked end of the arm pulls on the second end of the first lever, causing the first lever to pivot and urge the first end of the first lever against the first portion of the second lever.

14. The system of claim 10, further comprising a cam attached to the door, the cam having defined thereon a groove, wherein the movement assembly includes an arm to which the roller is attached, such that when the arm pivots, the roller rolls along the groove and thereby urges the cam and the vent door away from a vent.

15. The system of claim 10, further comprising a cam including a first portion attached to the vent door and a second portion pivotally attached to a surface outside of the vent door.

16. The system of claim 10, further comprising a cam attached to the door, the cam having defined thereon a groove, wherein the movement assembly further comprises a first arm, a second arm having a roller attached thereto, and a rod, the first and second arms being connected to the rod such that, when the rod rotates about its longitudinal axis, the first and second arms move correspondingly, the first arm being coupled to the first lever, the roller being disposed within the groove.

17. The system of claim 10, wherein the first lever is pivotally attached at a fulcrum point to the vent door, the movement assembly further comprising an arm that is coupled to the first lever when the vent door is opened and, during opening of the vent door, urges the portion of the first lever that extends beyond the vent door against the second lever which, in turn, pivots and applies pressure to a peripheral lip of the vent door thereby urging the vent door open.

18. The system of claim 10, wherein the vent door comprises a generally planar panel, a wall that surrounds, and is generally perpendicular to the panel, the panel and the wall defining a cavity, and a generally planar member disposed within the cavity and attached to the panel the movement assembly being attached to the generally planar member.

19. The system of claim 10, further comprising an aircraft door having a vent opening defined therein, wherein, when the vent door is in a closed position, it is seated within the opening.

20. An aircraft door venting system, the system comprising:

an aircraft door having a vent;

a vent door having an open position and a closed position, the vent door being seated within the vent when the vent door is in the closed position;

a rod disposed proximate to the vent door and rotatable about a longitudinal axis;

a first arm and a second arm attached to the rod, the first and second arms being generally perpendicular to the rod and pivotable about the longitudinal axis of the rod, the first arm having a hooked end, the second arm having attached thereto a roller;

a cam having a first portion that is attached to the vent door and a second portion that is pivotally attached to a surface of the aircraft door, the cam having defined thereon a groove, the roller being disposed within the groove;

a first lever pivotally attached to the vent door, a first end of the first lever being coupled to the hooked end of the first arm when the vent door is in the closed position and a second end of the first lever extending beyond the periphery of the vent door; and a second lever pivotally attached to the aircraft door, the first lever urging the second lever to pivot in response to movement of the first arm, the second lever urging the vent door to the open position in response to the urging of the first lever.

* * * * *